May 8, 1934.   B. F. MIESSNER   1,958,062
ELECTRICAL AMPLIFYING SYSTEM
Original Filed June 19, 1926
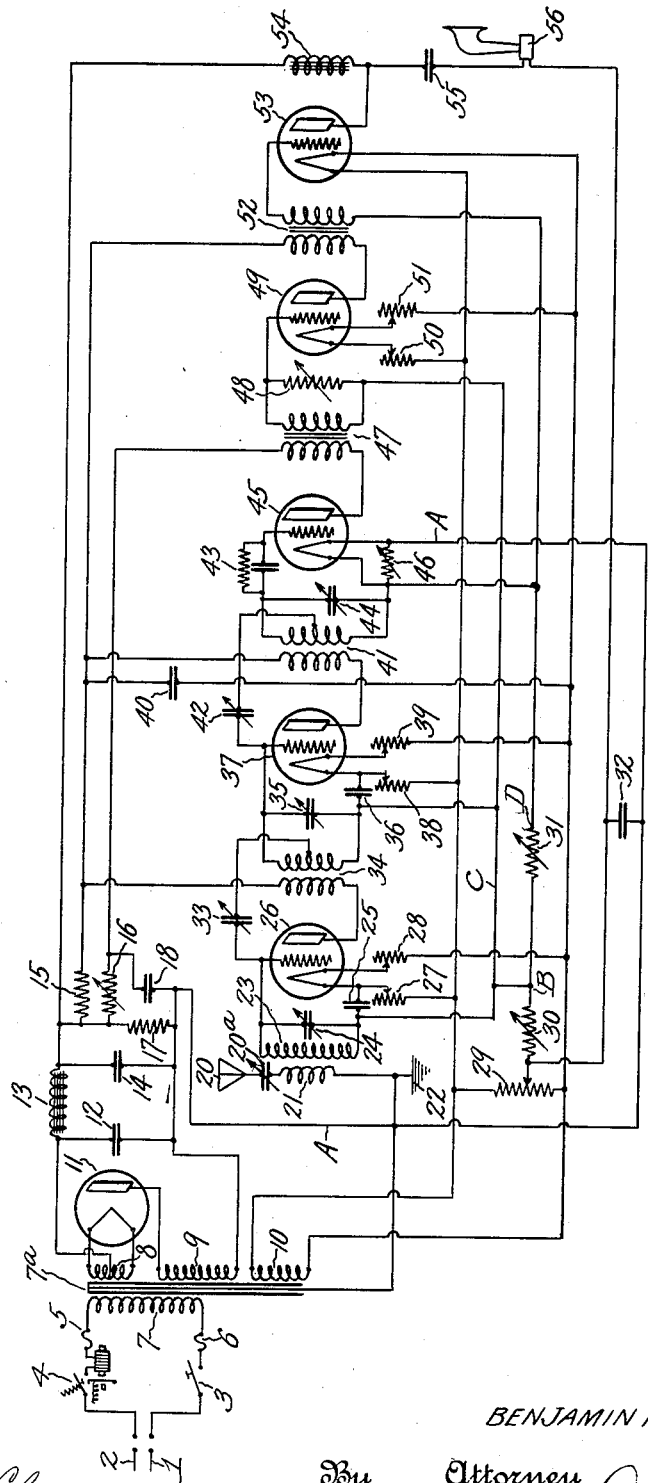
Inventor
BENJAMIN F. MIESSNER
WITNESS
By   Attorney Patented May 8, 1934

1,958,062

UNITED STATES PATENT OFFICE 1,958,062

ELECTRICAL AMPLIFYING SYSTEM

Benjamin F. Miessner, Short Hills, N. J., assignor, by mesne assignments, to Radio Corporation of America, New York, N. Y., a corporation of Delaware Division of application June 19, 1926, Serial No. 117,076. Continuation of application Serial No. 148,725, November 16, 1926. This application July 20, 1929, Serial No. 379,675

11 Claims. (Cl. 250—27)

This application is a division of my application, Serial Number 117,076 filed 19 June 1926 and a continuation of my application, Serial Number 148,725 filed 16 November 1926.

This invention relates to electrical amplifier systems and particularly to such as employ three electrode vacuum tubes as repeaters or amplifiers.

Systems of this character customarily include batteries or other steady direct current generators for energizing the different circuits of the system. Thus, in a radio receiving system it is customary to employ a battery, commonly known as the A battery, to supply the tube filaments with heating current; a battery, known as the B battery, to energize the plates of the tubes; and a battery, known as the C battery, to energize or bias the tube grids.

One object of my invention is to provide an improved amplifying system wherein one or more of such steady direct current generators is dispensed with and the energy is derived from a source of unsteady potential, such as the ordinary 60 cycle alternating current or machine generated fluctuating direct current for house lighting.

A further object is to provide a radio receiving system having a plate circuit, filament heating circuit and grid biasing circuit, and wherein all of such circuits are energized from a source of unsteady potential, and wherein no battery or other steady direct current generator is employed in the system.

Another object is to provide an amplifying system of this character wherein the employment of the source of unsteady potential does not create any disturbing effects in the system nor, in the case of a radio receiving system, does the employment of such a source create any hum or other disturbance which interferes with or masks the audible signal impulses transmitted through the system.

In the preferred embodiment of my invention, herein illustrated, I disclose a radio receiving system employing a plurailty of radio frequency amplifying tubes, a plurality of audio frequency amplifying tubes and a detector tube.

The filament of the detector tube in the illustrated form of my invention is heated by current flowing in the various plate circuits of the system. This current is derived from the alternating current supply mains through a rectifier and filter. The direct current produced by the rectifier and filter passes through the plate circuits of the various tubes in parallel and the currents from the individual plate circuits combine in a common return path, or circuit, to the filter. In this return path is included the filament of the detector tube. Also in the preferred embodiment of my invention I connect the grids of the several tubes to points of suitable potential in the return circuit from the plates and in this manner obtain the proper biasing voltage for the grids of the different tubes.

The particular form and arrangement of those several circuits as well as the special advantages which their use secures will be more particularly pointed out in the following description taken in connection with the accompanying drawing, which diagrammatically illustrates the circuit arrangement of a five-tube radio receiver constructed with the foregoing objects in mind.

The radio receiver diagrammatically illustrated in the drawing is what is commonly known as a neutralized five-tube radio frequency receiver in which the three electrode vacuum tubes 26 and 37 are radio frequency amplifiers, the vacuum tube 45 is a detector and the vacuum tubes 49 and 53 are low or audio frequency amplifiers. At 20 is shown an antenna for collecting radio signaling energy, having a variable condenser 20a, and a primary winding of a transformer 21 in series therewith, the antenna being grounded at 22. The secondary winding 23, cooperating with the variable condenser 24 permits of tuning the grid circuit of vacuum tube 26 to the frequency of any desired incoming signals. The second vacuum tube 37 is selectively associated with the first vacuum tube through the transformer 34 and variable condenser 35. The detector tube 45 is selectively associated with the second radio frequency tube through the transformer 41 and the variable condenser 44, the element 43 being the usual "grid leak-stopping condenser" combination employed in connection with detector action.

The first audio frequency amplifier 49 is associated with the detector tube through a suitable audio frequency transformer 47, shown to have a resistance 48 connnected across its secondary winding, this being one of the usual methods in the art to assure stable operation of an audio frequency amplifier. The second audio frequency amplifier tube 53 is associated with the first audio frequency amplifier through a suitable audio frequency transformer 52. A loud speaker or other suitable signal translating device 56 is energized by the final highly amplified signal currents from the final amplifier 53, through a capacity coupling condenser 55, which prevents direct current from flowing in the winding of the translating device to interfere with a predetermined polarizing of the magnetic system thereof, a serious matter in the case of the plate current required for a power amplifying tube, the signal currents being diverted to the translating device through the condenser 55 by action of the choke coil 54 in the plate circuit of the vacuum tube 53.

The two radio frequency stages are shown to be neutralized against oscillation production or excessive regenerative amplification caused by plate circuit reaction on the grid, through the internal capacity of the tube, through having variable condensers 33 and 42 connected to the grids of their respective tubes from a tap connection to the secondary winding of the transformers in the plate circuits of these tubes, this being a method in common use in existing commercial receivers for neutralizing for such reaction.

For the purpose of supplying energy to the system for amplification and detection of the signals received, I show at 1 and 2 the terminals of an alternating current supply system such as the usual house lighting system, across which is connected the primary 7 of an alternating current transformer. Connection between the primary and the supply system may be by a plug inserted in an ordinary house lighting socket. A suitable push switch 3, together with an automatic cutoff 4 and fuses 5 may be included in a line leading to the primary 7 of the transformer, which transformer would for ordinary 60-cycle alternating current have an iron core 7a, which iron core is preferably grounded, as shown, to the ground connection 22. A secondary 10 of the supply transformer, usually of the step-down character for house-lighting current characteristics, is the source of energy for heating the filaments of all of the vacuum tubes except the detector tube 45. The transformer secondary 10 is designed to give sufficient voltage for the filament of tube 53 which, being the last stage amplifying tube, may be a more powerful tube and desirably require higher filament voltage than the preceding tubes.

I connect the lower filament voltage tubes 26, 37 and 49 across the terminals of this same transformer by using the resistances 27 and 28, 38 and 39, and 50 and 51, in each leg of the filament connections of these respective tubes, the adjustments of the resistances shown permitting securing the desired voltage across these filaments as well as assuring equalizing the potential drop through the connections to the filament. This therefore provides for energizing or heating the filaments of all of the tubes except the detector tube 45 from an unmodified alternating current source, thereby avoiding the use of the so-called "A" battery for these filaments. The manner in which the filament of the detector tube 45 is energized, and the reason therefor, will be explained later.

The energy for exciting the plate circuits of the vacuum tubes is derived from the alternating current supply transformer through the secondary winding 9 which, for the ordinary characteristics of lighting supply of alternating currents, would be of the step-up form, say from 110 volts to about 450 volts. This alternating current energy is applied to a rectifier 11, shown as a two-electrode vacuum tube rectifier whose filament is heated by energy derived from a third secondary winding 8 of step-down character to give the required voltage for the filament of the utilized rectifier tube. The alternating current from the winding 9 is rectified in a manner well understood in the art and applied to the terminals of a filter formed by the two large capacity condensers 12 and 14 connected through a large inductance coil or choke 13, the filter acting in a well known manner to smooth out to a substantial degree half wave impulses resulting from rectification. It is, of course, understood that two rectifiers could be used to rectify both halves of the alternating current cycle giving what is known as full-wave rectification if desired, but I find that the present arrangement is more economical and is quite satisfactory in operation.

The smoothed-out rectified current is applied across the terminals of a high resistance 17, and I connect the plate of the final high power tube 53 across the terminals of this resistance to give the full voltage of the filter system to the plate circuit of this last tube, I having employed as high as 350 volts for this purpose. I connect the plates of the amplifier tubes 26, 37 and 49 across the resistance 17 through a series resistance 15 across which there is a drop of potential in order to apply a lower plate voltage to these tubes, as it is not generally necessary to use power tubes in these stages, and the type of tube I use may not be designed to stand the higher plate voltage of the final power tube. I have used about 150 volts on the plates of these three amplifier tubes. I connect the plate of the detector tube 45 across the resistance 17 through another series resistance 16, this resistance being chosen to give a drop of potential which will reduce the voltage on the plate of the detector tube to the desired amount, usually about 45 volts. As the resistance of 16 is quite high, I shunt it and the resistance 17 by a condenser 18 of fairly large capacity to permit by-passing high frequency and low frequency signal currents. It also acts further to filter or smooth out the ripples in the converted plate current energy supply. A similar condenser 40 shunts the resistances 15 and 17. The circuit through this condenser may be traced from the right hand terminal of resistance 15 through condenser 40, the lower half of potentiometer 29, resistances 30 and 31, filament of detector tube 45 back to the lower terminal of resistance 17.

It is thus seen that the plate circuits of all of the vacuum tubes are energized from the alternating current source, thereby eliminating the use of so-called "B" batteries, and that the arrangement provides for obtaining plate voltages of different degrees to energize the several vacuum tubes in accordance with the particular function they perform.

It is seen that the plate circuit current of all of the vacuum tubes come together or combine in one line A below the filter system, and by following this line through the diagram it will be seen that it passes through the filament of the detector tube 45, and thence to a contact on potentiometer 29, connected across the filament supply line, the current in proceeding to the contact on potentiometer 29 having to pass through resistance 31 and 30. In this way I utilize the plate current of the tubes in the system to energize or heat the filament of the detector tube 45, and to this end I choose a detector tube which has a filament current consumption for normal operation approximately equivalent to the total plate current utilized in all of the vacuum tubes, though it would be possible to utilize the plate current in less than all of the tubes.

If desired I may employ a resistance 46, which may be adjustable, across the filament terminals of the detector tube 45 of such proportion as to regulate the amount of current passing through the filament from the plate circuit system to the desired degree. It of course is understood that I may under certain conditions and if desired substitute a battery, or other source of substantially steady direct current, for heating the filament of the detector tube in lieu of employing the current from the plate circuit system.

Since the resistance 17 across the filter circuit is very high in value practically the only current drain on the filter is that doing useful work in the plate circuits of the several tubes, and by reducing the potential for the detector tube and low power amplifying tubes through series resistances 16 and 15 respectively, I eliminate the usual so-called "loss current" low resistance usually employed in shunt to the filter as a potential divider. This elimination of "loss current" and any other unnecessary current drain on the filter system is very important, for obviously the less the current drain on a filter the better the filtration for a given quantity of filter material, it being readily apparent that at no load the filtration is substantially perfect and decreases in perfection as the load increases.

It is further seen that my inclusion of the grid bias resistances 30 and 31 in the common return outside of the filter does not increase the current drain on the filter as is the case when reliance is had on a "loss current" resistance in shunt to the filter for the required biasing potential. It will also be noted that the current I use for heating the detector filament is so obtained as not to increase the current drain on the filter.

When the filament of a vacuum tube is excited from a source of current which varies through a wide range, as is the case with alternating current, the temperature variations with resulting variations in electron emission become quite substantial, with the result that substantial fluctuations in the plate circuit current are created from this cause. Also, where the grid circuit must necessarily be connected to the filament system, and where the filament supply potential varies through wide range, it is difficult to prevent these potential fluctuations from being manifested on the grid, and therefore creating another source of plate circuit current variations.

Since the detector tube is the first tube in the system to be connected to the low frequency amplifying portion through a low frequency transformer, which thereby efficiently permits the low frequency variations of the alternating current source to be passed on to the low frequency amplifying portion, and since the low frequency amplifying portion often comprises two or more stages following the detector, any variations in the detector system are highly amplified in the subsequent stages of the system.

It is for this reason that systems employing alternating current as a source of energizing the vacuum tubes have not heretofore met with success in those attempts to employ a vacuum tube as a detector having its filament, like the other tubes of the system, energized by alternating current.

While the combined plate currents of all the tubes which I pass through the filament of the detector tube is not entirely steady, including as it does the ripples left by incomplete filtration, together with variations representing both high and low frequency signal energy, yet the major portion of the current is of direct nature, having these ripples and variations superimposed on the surface, so to speak, and therefore of small magnitude compared to the main body of the current with the result that the arrangement is most satisfactory towards eliminating a heretofore serious difficulty in connection with alternating current energized systems.

I find that a tube now commercially available requiring .06 amperes to heat the filament approximately coincides with the current I have found available from the several plate circuits of one of the systems I have built.

To avoid the use of the so-called "C" batteries to obtain an initial potential or bias on the grids of the tubes, as is the practice in the adjustment of three-electrode vacuum tubes to act as amplifiers with little or no distortion, as before stated, I cause the combined plate currents of the system to pass, after passing through the filament of the detector 45, through resistances 31 and 30 in proceeding to the filament system through the contact on the potentiometer 29 across the filament supply leads. The combined plate currents in passing through these resistances create differences of potential between the filament system and the opposed terminals of the resistances.

Since I do not require as high grid bias on the amplifying tubes 26, 37 and 49, which are excited with less potential on the plates as is required for the power tube 53, which is excited with high potential on the plate, I connect these low power amplifying tubes to the point B, through the common connecting wire C, the resistance 30 being adjusted to give the desired drop of potential to create the desired grid bias for these tubes.

To obtain a higher grid bias for the power tube 53 I connect its grid to the point D, adjusting the resistance 31, the combined drops of potential across the resistance 30 and 31 giving the required grid bias for the power tube.

It will be seen that by employing the drop of potential created by the combined current of the plate system, resistances of smaller value are required to give the necessary drop of potential than would be the required value of resistances if the grid bias for each tube was had by utilizing the individual current of that tube passing through a resistance. These resistances constitute coupling elements capable of transferring energy from plate circuit back to grid circuit in the several tubes, as well as from a succeeding tube back to a preceding tube, and are, therefore, elements tending to make the system unstable by regenerative effects if provision is not make for keeping these effects to practical low limits. A step toward this end is accomplished by utilizing, as before stated, the combined current to create the drop of potential, thereby making the resistance low and therefore the resistance coupling low.

Also a condenser 32 of large value is connected so as to shunt the resistances 30 and 31 and filament of tube 45, thereby permitting ripples and variations to avoid these resistance elements through a low impedance path, further reducing the coupling effects, so that it is principally the main body or steady portion of the combined plate current that passes through the resistances 30 and 31. This condenser 32 also has the effect of short-circuiting the varying component of the combined plate current from the filament of the detector tube 45, thereby making the detector tube less susceptible to creating the plate circuit variations heretofore discussed.

I also find it desirable to offset to some extent in the radio frequency amplifiers the coupling created by the resistance 30, and to do so I employ by-pass condensers 25 and 36 between the filaments and the tuned portions of the grid circuits, these by-pass condensers acting to prevent high frequency currents which might be fed back from reaching the grids. I find that the use of these by-pass condensers facilitates neutralizing the system by means of the condensers 33 and 42 previously referred to.

The detector tube is usually operated without any substantial grid bias. I have shown the grid of the detector tube 45 connected directly to the filament instead of across a resistance creating any substantial drop of potential, as is the case with the amplifier tubes.

It will be seen that I have shown a system completely energized for its amplifier and detector functions from a source of alternating current. Its operation as a radio receiver will be briefly described. The high frequency radio signaling energy is collected on the antenna 20, and controlled in amount by the variable condenser 20a, the high frequency energy thus controlled in degree being transferred to the radio frequency amplifier 26 through the secondary coil 23 cooperating with the tuning condenser 24. After being amplified by the vacuum tube 26, the high frequency energy is transferred to the high frequency amplifier 37 selectively by means of the transformer 34 and the tuning condenser 35. The neutralizing condenser 33, being properly adjusted and in cooperation with its tap-off from the secondary winding of transformer 34, prevents the reaction of the amplified currents in the plate circuit of vacuum tube 26 from creating oscillations in this tube and its circuits. Likewise, the neutralizing condenser 42 and the corresponding tap-off prevent the high frequency amplified currents in vacuum tube 37 from reacting to cause oscillations. The high frequency amplified currents are transferred from the plate circuit of vacuum tube 37 to the detector tube 45 selectively through the transformer 41 and the tuning condenser 44. The high frequency currents are distorted by the detector tube 45, and pass through the audio frequency transformer 47 as low frequency current representing the desired signals into the first audio frequency amplifying tube 49, and thence through audio frequency transformer 52 to the power amplifier tube 53, in whose plate circuit is located a high impedance choke coil 54, which permits the energizing of the plate of the tube from the filter, but is most effective in diverting the desired signal currents through the high capacity condenser 55 into the loud speaking or other suitable translating device 56.

I claim:

1. A system of the character described, comprising a source of pulsating uni-directional current, a plurality of amplifier tubes, each having a plate, filament and grid, and a detector tube, connections between the plates of said amplifier tubes and said source, a common return connection from the filaments of all of said amplifier tubes to said source, said return connection including a resistance, means for supplying a relatively high biasing potential to the grid of one of said tubes comprising a connection between such grid and a point in said return connection between said resistance and source, means for supplying a relatively low biasing potential to the grid of another of said tubes comprising a connection between the grid of said other tube and an intermediate point of said resistance and means comprising a condenser of large capacity shunting said resistance.

2. A system of the character described including a source of audio frequency pulsating uni-directional current, a plurality of amplifier tubes each having a plate, filament and grid, and a detector tube, said amplifier tubes being connected in cascade arrangement for successive radio frequency and audio frequency amplification, parallel connections between the plates of said amplifier tubes and the positive terminal of said source, a common return connection from the filaments of all of said amplifier tubes to the negative terminal of said source, said return connection including an adjustable energy consuming device for developing therein a difference of potential, parallel connections between the grids of the radio frequency amplifying tubes and the grids of the audio frequency amplifying tubes of said system to at least two difference of potential points in said energy consuming device for biasing said grids from the same source, and means comprising a condenser shunting said energy consuming device of low impedance to audio frequency currents and pulsations.

3. A system of the character described including a source of audio frequency pulsating uni-directional current, a plurality of amplifier tubes each having a plate, filament and grid, and a detector tube, said amplifier tubes being connected for audio frequency cascade amplification and the last of said tubes being adapted to operate at higher plate and grid potentials than the preceding tubes, parallel connections between the plates of said tubes and the positive terminal of said source including means for reducing the plate potentials supplied to said preceding tubes, a common return connection from the filaments of all of said amplifier tubes to the negative terminal of said source, said return connection including an energy consuming device for developing therein difference of potential, a connection from the grid of said last tube to a point of high difference of potential in said energy consuming device, and a grid connection from at least one of said preceding tubes to a point of lesser difference of potential in said energy consuming device, and a circuit including means of low impedance to audio frequency currents and pulsations shunting said device.

4. A system of the character described including a source of audio frequency pulsating uni-directional current, a plurality of vacuum tubes each having a plate, filament and grid, said tubes being connected in cascade arrangement for successive radio frequency and audio frequency amplification, and including a plurality of audio frequency amplifying tubes the last of which operates at higher plate potential and grid potential than preceding radio frequency and audio frequency amplifying tubes, parallel connections between the plates of said tubes and the positive terminal of said source including means for reducing the plate potentials supplied to said preceding audio and radio frequency amplifying tubes, a common return connection from the filament of at least one of said preceding audio frequency amplifying tubes and at least one of the filaments of said radio frequency amplifying tubes to the negative terminal of said source, said return connection including an energy consuming device for developing therein a difference of potential, and a connection from the grid of at least one of said radio frequency amplifying tubes and at least one of said preceding audio frequency amplifying tubes to a point of potential in said energy consuming device whereby said grids are negatively biased, and means for biasing the grid of said last tube at a higher potential derived from said source of current.

5. A system of the character described including a source of audio frequency pulsating unidirectional current, a plurality of amplifier tubes each having a plate, filament and grid, and a detector tube, said amplifier and detector tubes being connected in cascade arrangement for successive radio frequency and audio frequency amplification, parallel connections between the plates of the amplifier tubes and the positive terminal of said source, a common return connection from the filaments of the amplifier tubes to the negative terminal of said source, said return connection including an adjustable energy consuming device for developing therein a difference of potential, connections from the grids of said tubes to a difference of potential point of said energy consuming device, and means including a non-conductive device shunting said energy consuming device having low impedance to audio frequency currents and pulsations.

6. A system of the character described comprising a source of alternating current, a rectifier connected thereto and adapted to deliver a pulsating uni-directional current, a filter system connected across the output of said rectifier, a plurality of amplifier tubes having plates, grids and filaments, and a detector tube and said tubes being adapted to be operated at different plate voltages, parallel connections between said plates of the amplifier tubes and one side of said filter system, one of said connections including a resistance, a common connection between the filaments of said amplifier tubes and the other side of said output circuit, said connection including two resistances in series and means including a condenser shunting said resistances and means for biasing the grids of certain of said tubes comprising connections between points of different potential differences in said common connection and said grids.

7. In combination, a source of alternating current, a rectifier therefor, a filter system connected across the output of the rectifier, at least one radio frequency amplifier tube, a detector tube, and at least one audio frequency amplifier tube, the said tubes being adapted to operate at different plate voltages, connections between the plates of said tubes and the positive side of the filter system, a common connection between the cathode of each tube and the negative side of the filter system, an adjustable resistance path in said connection, means for connecting at least the grid of said audio frequency amplifier tube to a predetermined point on said path for negatively biasing the grid, and additional means for connecting the grid of the radio frequency amplifier tube to a point on said path for biasing it less negatively than the audio amplifier grid.

8. In combination, a source of alternating current, a rectifier therefor, a filter system connected across the output of the rectifier, at least one radio frequency amplifier tube, a detector tube, and at least one audio frequency amplifier tube, the said tubes being adapted to operate at different plate voltages, connections between the plates of said tubes and the positive side of the filter system, a common connection between the cathode of each tube and the negative side of the filter system, an adjustable resistance path in said connection, means for connecting at least the grid of said audio frequency amplifier tube to a predetermined point on said path for negatively biasing the grid, said common connection including the detector tube cathode in series therein.

9. In combination, a source of alternating current, a rectifier therefor, a filter system connected across the output of the rectifier, at least one radio frequency amplifier tube, a detector tube, and at least one audio frequency amplifier tube, the said tubes being adapted to operate at different plate voltages, connections between the plates of said tubes and the positive side of the filter system, a common connection between the cathode of each tube and the negative side of the filter system, an adjustable resistance path in said connection, means for connecting at least the grid of said audio frequency amplifier tube to a predetermined point on said path for negatively biasing the grid and an adjustable resistor in shunt with the cathode of the detector tube.

10. In combination, a source of alternating current, a rectifier therefor, a filter system connected across the output of the rectifier, at least one radio frequency amplifier tube, a detector tube, and at least one audio frequency amplifier tube, the said tubes being adapted to operate at different plate voltages, connections between the plates of said tubes and the positive side of the filter system, a common connection between the cathode of each tube and the negative side of the filter system, an adjustable resistance path in said connection, means for connecting the grid of said audio frequency amplifier tube to a predetermined point on said path for negatively biasing the grid, said path consisting of a pair of adjustable resistors in series and means for connecting the grid of the radio frequency amplifier tube to another point on said path.

11. In combination a source of alternating current, a rectifier therefor, a filter system connected across the output of the rectifier, at least one radio frequency tube, at least one detector tube and at least one audio frequency amplifier tube the said tubes being adapted to operate at different plate voltages, connections between the plates of said tubes and the positive side of the filter system, a common connection between the cathode of each tube and the negative side of the filter system, a resistance path in said connection comprising at least two adjustable resistors in series, means for connecting the grid of a radio frequency amplifier tube to one terminal of one of said resistances whereby said resistance is both in the input circuit and the output circuit of the radio frequency tube, the drop across said resistance acting to negatively bias the grid of the radio frequency tube with respect to the cathode thereof, the characteristics of said tube being varied by variations of said adjustable resistor, means for connecting the grid of an audio frequency amplifier tube to a terminal of the other of said resistors in such a way that said last named resistor is both in the input and output circuits of the audio frequency tube whereby the drop across the last named resistor negatively biases the grid of the audio frequency tube, the characteristics of said audio frequency tube being varied by variations in said last named resistor.

BENJAMIN F. MIESSNER.